United States Patent
Downey

(10) Patent No.: US 9,614,706 B2
(45) Date of Patent: *Apr. 4, 2017

(54) METHOD AND APPARATUS FOR MULTI-CARRIER MODULATION (MCM) PACKET DETECTION BASED ON PHASE DIFFERENCES

(71) Applicant: Echelon Corporation, San Jose, CA (US)

(72) Inventor: Walter J. Downey, Los Gatos, CA (US)

(73) Assignee: ECHELON CORPORATION, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/006,808

(22) Filed: Jan. 26, 2016

(65) Prior Publication Data

US 2016/0142240 A1 May 19, 2016

Related U.S. Application Data

(63) Continuation of application No. 13/837,947, filed on Mar. 15, 2013, now Pat. No. 9,413,575.

(51) Int. Cl.
*H04L 27/06* (2006.01)
*H04L 27/22* (2006.01)
(Continued)

(52) U.S. Cl.
CPC ........... *H04L 27/22* (2013.01); *H04B 3/54* (2013.01); *H04B 3/542* (2013.01); *H04L 27/233* (2013.01);
(Continued)

(58) Field of Classification Search
CPC ........... H04L 27/2657; H04L 27/2649; H04L 27/2656; H04L 27/2692; H04L 1/0039; H04L 27/233; H04L 27/06
(Continued)

(56) References Cited

U.S. PATENT DOCUMENTS

| | | | |
|---|---|---|---|
| 4,833,694 A | 5/1989 | Young et al. | |
| 5,343,499 A | 8/1994 | Jasper | |

(Continued)

OTHER PUBLICATIONS

Non-Final Office Action for U.S. Appl. No. 13/837,947, mailed Jun. 18, 2014, 13 pages.
(Continued)

*Primary Examiner* — Emmanuel Bayard
(74) *Attorney, Agent, or Firm* — Nicholson De Vos Webster & Elliott LLP

(57) ABSTRACT

A method is disclosed for detecting packet at a receiving system in a Multi-Carrier Modulation (MCM) system. The method starts with receiving a signal at the receiving system. Then a deviation value of the signal is computed, where the deviation value is computed at least partially based on phase differences between some number of carriers in the preamble. The deviation value is compared with a threshold to determine whether a packet has been detected from the received signal. In response to the determination that a packet has been detected, a symbol offset is computed optionally, where the symbol offset indicates a number of sample points from a beginning of a symbol.

22 Claims, 9 Drawing Sheets

(51) Int. Cl.
*H04L 27/26* (2006.01)
*H04B 3/54* (2006.01)
*H04L 27/233* (2006.01)

(52) U.S. Cl.
CPC ...... *H04L 27/2613* (2013.01); *H04L 27/2649* (2013.01); *H04L 27/2656* (2013.01); *H04L 27/2657* (2013.01); *H04L 27/2692* (2013.01)

(58) Field of Classification Search
USPC ................................ 375/340, 260, 257, 226
See application file for complete search history.

(56) References Cited

U.S. PATENT DOCUMENTS

| | | | |
|---|---|---|---|
| 5,457,710 A | 10/1995 | Miyo et al. | |
| 5,840,448 A * | 11/1998 | Borodovsky | G03F 1/144 |
| | | | 430/5 |
| 5,883,923 A | 3/1999 | Shimazaki | |
| 6,038,253 A | 3/2000 | Shimazaki | |
| 6,101,230 A | 8/2000 | Chun et al. | |
| 6,175,600 B1 | 1/2001 | Guillemain et al. | |
| 6,246,717 B1 | 6/2001 | Chen et al. | |
| 6,563,885 B1 | 5/2003 | Magee et al. | |
| 6,778,622 B2 * | 8/2004 | Bombay | H04L 27/2657 |
| | | | 370/516 |
| 6,865,232 B1 | 3/2005 | Isaksson et al. | |
| 6,907,272 B2 | 6/2005 | Roy | |
| 6,928,120 B1 * | 8/2005 | Zhang | H04L 27/2679 |
| | | | 370/464 |
| 7,009,932 B2 * | 3/2006 | Matheus | H04L 27/2695 |
| | | | 370/203 |
| 7,061,997 B1 | 6/2006 | Eberlein et al. | |
| 7,206,279 B2 | 4/2007 | Taga et al. | |
| 7,269,125 B2 | 9/2007 | Smallcomb | |
| 7,280,621 B1 | 10/2007 | Murphy | |
| 7,302,024 B2 | 11/2007 | Arambepola | |
| 7,336,841 B2 * | 2/2008 | Neogi | H04N 19/467 |
| | | | 375/E7.089 |
| 7,346,098 B2 | 3/2008 | Chen et al. | |
| 7,352,691 B2 | 4/2008 | Hagen | |
| 7,496,340 B1 | 2/2009 | Chen et al. | |
| 7,548,587 B2 * | 6/2009 | Zhang | H04L 27/2679 |
| | | | 375/260 |
| 7,668,252 B2 | 2/2010 | Sandell et al. | |
| 7,668,260 B2 | 2/2010 | Arambepola | |
| 7,679,555 B2 | 3/2010 | Dai et al. | |
| 7,696,922 B2 | 4/2010 | Nicholson et al. | |
| 7,697,617 B2 | 4/2010 | Ray | |
| 7,710,857 B2 | 5/2010 | Yousef | |
| 7,724,849 B2 * | 5/2010 | Ling | H04L 1/20 |
| | | | 375/346 |
| 7,853,418 B2 | 12/2010 | Mikkonen | |
| 7,957,474 B2 | 6/2011 | Waters et al. | |
| 7,971,108 B2 | 6/2011 | Zopf et al. | |
| 8,054,914 B2 | 11/2011 | Waters et al. | |
| 8,073,079 B1 | 12/2011 | Ahmed | |
| 8,229,010 B2 | 7/2012 | Adachi et al. | |
| 8,270,509 B2 | 9/2012 | Lindoff et al. | |
| 8,320,233 B2 | 11/2012 | Razazian et al. | |
| 8,358,644 B2 | 1/2013 | Baxley et al. | |
| 8,391,383 B2 * | 3/2013 | Ponnampalam | H04L 27/2627 |
| | | | 370/203 |
| 8,416,889 B2 * | 4/2013 | Dell'Amico | H04L 25/022 |
| | | | 375/259 |
| 8,454,528 B2 | 6/2013 | Yuen et al. | |
| 8,477,888 B2 | 7/2013 | Lu et al. | |
| 8,483,301 B2 * | 7/2013 | Ray | H04W 56/0065 |
| | | | 375/260 |
| 8,494,011 B2 | 7/2013 | Barry et al. | |
| 8,503,592 B2 | 8/2013 | Strait | |
| 8,515,292 B2 * | 8/2013 | Xu | H04L 27/223 |
| | | | 398/202 |
| 8,537,934 B2 | 9/2013 | Joshi et al. | |
| 8,594,153 B2 | 11/2013 | McDermott | |
| 8,665,976 B2 | 3/2014 | Bhat et al. | |
| 8,675,753 B2 | 3/2014 | Strait | |
| 8,705,676 B2 | 4/2014 | Ayrapetian et al. | |
| 8,767,855 B2 * | 7/2014 | Zhang | H04L 27/3455 |
| | | | 375/261 |
| 8,830,121 B2 | 9/2014 | Vollath | |
| 8,873,666 B2 | 10/2014 | Kakishima et al. | |
| 8,929,749 B2 | 1/2015 | Roberts et al. | |
| 9,166,839 B2 * | 10/2015 | Plevel | H04L 25/063 |
| 9,363,128 B2 * | 6/2016 | Downey | H04L 1/0039 |
| 2002/0065047 A1 | 5/2002 | Moose | |
| 2003/0021336 A1 | 1/2003 | Iwasaki | |
| 2003/0123491 A1 | 7/2003 | Couillard | |
| 2004/0114675 A1 | 6/2004 | Crawford | |
| 2004/0125894 A1 | 7/2004 | Nakamura et al. | |
| 2004/0142728 A1 | 7/2004 | Tari et al. | |
| 2004/0258144 A1 * | 12/2004 | Omori | H04B 17/336 |
| | | | 375/224 |
| 2005/0111530 A1 | 5/2005 | Chen et al. | |
| 2006/0067438 A1 | 3/2006 | Menkhoff et al. | |
| 2006/0133259 A1 | 6/2006 | Lin et al. | |
| 2006/0209979 A1 | 9/2006 | Sandell et al. | |
| 2007/0030931 A1 | 2/2007 | Arambepola | |
| 2007/0127358 A1 | 6/2007 | Sun et al. | |
| 2007/0133586 A1 | 6/2007 | Ojard et al. | |
| 2007/0263712 A1 | 11/2007 | Ling et al. | |
| 2008/0043649 A1 | 2/2008 | Bhukania et al. | |
| 2008/0095384 A1 | 4/2008 | Son et al. | |
| 2008/0123746 A1 | 5/2008 | Ueda et al. | |
| 2008/0168839 A1 | 7/2008 | Katsuyama | |
| 2008/0317150 A1 | 12/2008 | Alexander et al. | |
| 2009/0097577 A1 | 4/2009 | Adachi et al. | |
| 2009/0304133 A1 | 12/2009 | Umari et al. | |
| 2010/0195772 A1 | 8/2010 | Kodama et al. | |
| 2010/0202552 A1 | 8/2010 | Sakai et al. | |
| 2011/0022904 A1 | 1/2011 | Zopf et al. | |
| 2011/0181510 A1 | 7/2011 | Hakala et al. | |
| 2011/0305198 A1 | 12/2011 | Aue et al. | |
| 2012/0250799 A1 | 10/2012 | Bhat et al. | |
| 2013/0089342 A1 | 4/2013 | Oveis Gharan et al. | |
| 2013/0243062 A1 | 9/2013 | Raju et al. | |
| 2013/0285748 A1 | 10/2013 | Hongo | |
| 2014/0269948 A1 | 9/2014 | Downey | |
| 2014/0334560 A1 | 11/2014 | Yanagisawa et al. | |

OTHER PUBLICATIONS

Final Office Action for U.S. Appl. No. 13/837,947, mailed Nov. 18, 2014, 15 pages.
Notice of Allowance for U.S. Appl. No. 13/837,947, mailed Feb. 25, 2015, 10 pages.
Notice of Allowance for U.S. Appl. No. 13/837,947, mailed Feb. 24, 2016, 11 pages.
Non-Final Office Action for U.S. Appl. No. 13/838,211, mailed Jul. 16, 2014, 18 pages.
Final Office Action for U.S. Appl. No. 13/838,211, mailed Dec. 22, 2014, 13 pages.
Non-Final Office Action for U.S. Appl. No. 13/838,211, mailed Mar. 9, 2015, 14 pages.
Notice of Allowance for U.S. Appl. No. 13/838,211, mailed Sep. 17, 2015, 7 pages.
Notice of Allowance for U.S. Appl. No. 13/838,211, mailed Feb. 12, 2016, 12 pages.
European Search Report for Application No. 14159668.4, mailed Jun. 25, 2015, 9 pages.
European Search Report (Application 14159653.6), Jul. 29, 2015, 7 pages.
Lott, M., Comparison of Frequency and Time Domain Differential Modulation in an OFDN system for wireless ATM, 49th Vehicular Technology Conference, May 16, 1999, p. 877-883, IEEE US.
Alexandre Skrzypeczak, et al., "Application of the OFDM/OQAM Modulation to Power Line Communctions," Mar. 26, 2007, 6 pages, IEEE.
Kaveh Razazian, et al., "G3-PLC Specification for Powerline Communiation: Overview, System Simulation and Field Trial Results," Mar. 28, 2010, 6 pages, IEEE.

(56) References Cited

OTHER PUBLICATIONS

Notice of Allowance for U.S. Appl. No. 13/837,947, mailed May 18, 2016, 14 pages.

* cited by examiner

METHOD AND APPARATUS FOR MULTI-CARRIER MODULATION (MCM) PACKET DETECTION BASED ON PHASE DIFFERENCES

RELATED APPLICATION

This application is related to co-pending U.S. patent application Ser. No. 13/838,211, entitled "Method and Apparatus for Phase-Based Multi-Carrier Modulation (MCM) Packet Detection," filed Mar. 15, 2013, which is incorporated by reference herein in its entirety.

FIELD OF THE INVENTION

The invention relates to signal processing in a communication system. Specifically, it relates to packet detection in a Multi-Carrier Modulation (MCM) system.

PRIOR ART AND RELATED ART

Multi-Carrier Modulation (MCM) is a method of encoding digital data on multiple carrier frequencies. OFDM has been utilized in a wide variety of communication systems, such as wireless or radio frequency (RF) systems, copper wire system, and power line communication (PLC) systems. In an MCM system, a number of carriers (sometimes referred to as carrier signals, the two terms are used interchangeably within this specification) are used to carry data on several parallel data streams or channels. Each carrier is modulated with a modulation scheme (such as quadrature amplitude modulation or phase-shift keying) at a lower symbol rate, maintaining total data rates similar to conventional single-carrier modulation schemes in the same bandwidth. When the carriers are orthogonal to each other at a MCM system, the MCM system is generally referred to as an Orthogonal Frequency-Division Multiplexing (OFDM) system. Because OFDM systems are the most popular forms of MCM systems so far, all MCM systems with non-orthogonal carriers are often referred to as non-OFDM MCM systems or simply non-OFDM systems.

In designing an MCM receiving system, finding a cost-effective carrier detection scheme is often a challenge, particularly when the MCM receiving system is required to be low cost or low power thus cannot implement a powerful processor. Thus, correlation-based carrier detection known in the art may not be viable in this kind of MCM receiving systems and new ways of carrier and packet detection is needed.

SUMMARY OF THE INVENTION

A method is disclosed for detecting packet at a receiving system in a Multi-Carrier Modulation (MCM) system. The method starts with receiving a signal at the receiving system. Then a deviation value of the signal is computed, where the deviation value is computed at least partially based on phase differences between some number of carriers in the preamble. The deviation value is compared with a threshold to determine whether a packet has been detected from the received signal. In response to the determination that a packet has been detected, a symbol offset is computed optionally, where the symbol offset indicates a number of sample points from a beginning of a symbol.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
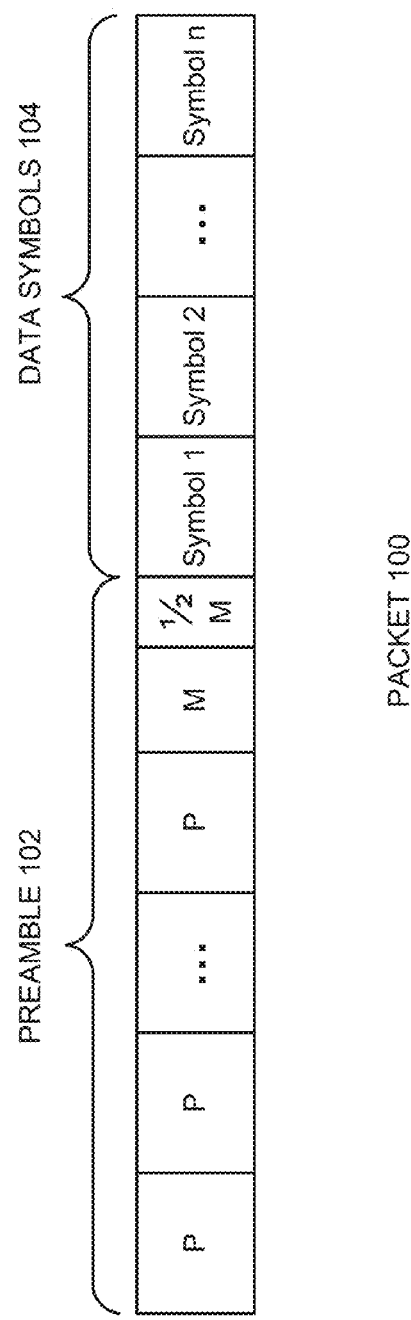
FIG. 1 illustrates a data frame structure used for data transmission in a Multi-Carrier Modulation (MCM) system.

FIG. 1 illustrates a data frame structure used for data transmission in a Multi-Carrier Modulation (MCM) system. Packet 100 includes preamble 102 with a number of P symbols and 1½ M symbols. In one embodiment, there are 8 P symbols in preamble 102. P symbols may be used for symbol synchronization, channel estimation, initial phase reference estimation, and automatic gain control (AGC). For M symbols, two types of symbol may be used. One is the M1 in which all the carriers may be $\pi$ phase shifted and the other one is M2 in which all the carriers may be $\pi/2$ phase shifted.

At the receiver, the phase distance between symbol P and symbol M waveforms may be used for packet frame synchronization purpose.

The preamble consists of a set of unmodulated carriers (or carriers without modulation, the two terms are used interchangeably within the specification) transmitted within a duration of multiple symbol times. The frequencies of these carriers generally are multiples of some base frequency and each carrier may contain a different initial phase. Preamble 102 is transmitted before data symbols 104, which contains a number of symbols. Data symbols 104 may not use the same set of carriers as the preamble 102. In addition, data symbols 104 use modulated carriers though modulation schemes such as phase-shifting keying (PSK).

Note that data symbols 104 are generally modulated using square wave phase modulation in an OFDM system. In a non-OFDM MCM system, data symbols 104 uses other phase modulation such as Nyquist shaped phase modulation. For packet detection/synchronization, the focus is on the preamble—detecting its carriers and their phases while the differences of data symbol modulation schemes between an OFDM and non-OFDM MCM system are of little concern. Thus, while embodiments of the inventions herein are often disclosed using OFDM systems only as examples, the embodiments of the inventions may be used in other non-OFDM MCM systems as well.

Packet 100 is sent from an MCM transmitting system, going through a transmission channel (e.g., wireless/RF channel, copper wire, or a power line), and arrived at an MCM receiving system. In designing an MCM receiving system, the goal should be to make the data decoding function, not the packet detection/synchronization function, be the limiting factor on whether or not a packet is successfully decoded. This should be achievable since packets can be designed so that there is more redundancy in the preamble section than the data symbol section, thus data errors should limit packet reception. Yet, an MCM receiving system using correlation-based carrier detection techniques known in the art may not be able to achieve the goal due to several drawbacks.

A correlation-based carrier detection technique tends to be computationally intensive. A correlation requires $N^2$ multiple-accumulates for an N-point symbol. For an MCM receiving system required to be low cost or low power (e.g., a power line modem), a digital signal processing (DSP) processor with less computing power is desirable. Yet a DSP processor with less computing power may not be able to perform computationally expensive algorithm like $N^2$ multiple-accumulates.

In addition, the output value of a correlation-based detection is generally a function of packet amplitude. Packet amplitude sometimes varies over an extremely wide range and is unknown at the time the algorithm is in play. For example, in a power line communication (PLC) system, the packet amplitude varies over a range of 80 dB. In addition, the output value also varies with noise level, which is unknown because it varies over time. Proper detection involves knowing what level of correlation out to expect which requires normalization or estimates of packet levels. Techniques are known in the art to estimate the packet level, but they are not desirable and poor estimate causes performance issues.

Furthermore, in some systems, correlation values in the presence of noises are poor. For example, in a PLC system, the correlation values are poor for certain types of noises commonly found on the power line (e.g., large harmonically rich tones). In these cases, the packet waveform can be dominated by a few impairment harmonics such that very low correlations result.

With the drawbacks discussed above, correlation-based carrier detection is not suitable for PLC systems or other systems sharing the characteristics of PLC systems (e.g., requiring low-power or low-cost receiving systems, having wide range or unknown amplitude packet amplitude, and/or noise correction values being low). Thus, a new approach of preamble carrier detection and symbol offset determination for packet detection is needed.

As shown in FIG. 1, MCM packets are composed of many symbols, each of which contains a multiplicity of carriers. The carrier frequencies chosen are usually all multiples of a single frequency $f_0$ which is chosen to be the inverse of the computed symbol time $T_s$. A judicious choice combined with picking the input sample rate of a receiving system to be a binary multiple N of $T_s$ allows the demodulation of the symbols to be accomplished with the use of a discrete Fourier Transform (DFT). The DFT is commonly implemented as a fast Fourier Transform (FFT), although other DFT methods may be utilized. Note that the actual symbol time TA can be extended to be longer than $T_s$ by adding a cyclic prefix to allow for dispersion in the channel, but the transform is computed using a subset of N points.

When a binary phase-shift keying (BPSK) modulation is used, data is encoded by square wave phase modulating each carrier with a peak-to-peak deviation of $\pi$ radians around some chosen reference phase $\theta_k$. Thus the nth symbol could be represented mathematically as function of time t by $$S_n = \sum_{k=c_0}^{c_0+n_c-1} A_k e^{j(2\pi f_0 kt + \theta_k + \pi d_{k,n})}$$

where $c_0$ is the number of the first of $n_c$ carriers and $d_{k,n}$ is the binary data for the $k^{th}$ carrier of the $n^{th}$ symbol.

At the receiving system, decoding of these symbols requires that a valid packet has been detected and that the symbol boundaries have been determined. As illustrated in FIG. 1, a preamble is usually pre-pended to the data section of the packet to facilitate this packet detection and synchronization. The number of constant non-modulated P-symbols may (although must not) use a same frequency carrier set as the data portion of the packet. This has the advantage of having a very similar frequency energy distribution as the data section of the packet and being unique enough that it can be distinguished from other non-packet energy (e.g. noise or interference) that can exist on the channel So the $n^{th}$ P-symbol can be represented by $$P_n = \sum_{k=c_0}^{c_0+n_c-1} A_k e^{j(2\pi f_0 tk + \theta_k)}$$

which is essentially a data symbol except all the data values have been set to zeros.

Figure 2:
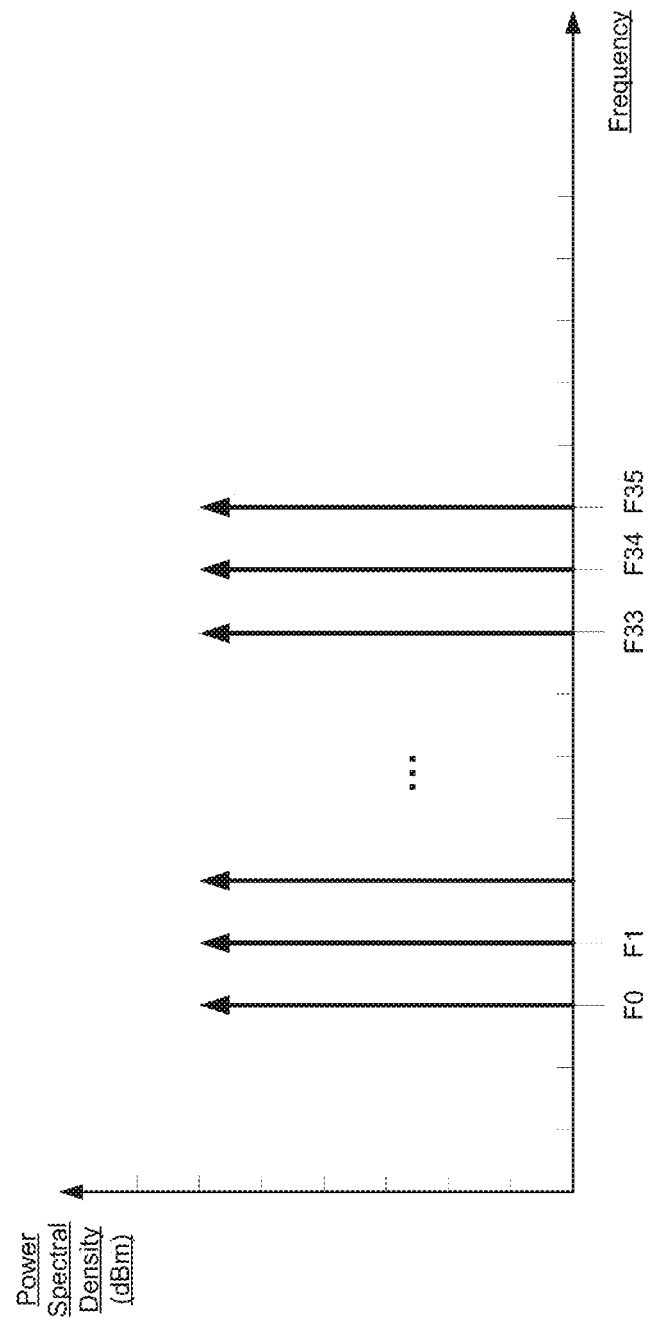
FIG. 2 illustrates a number of unmodulated carriers in a Multi-Carrier Modulation (MCM) system.

FIG. 2 illustrates a number of unmodulated carriers in a Multi-Carrier Modulation (MCM) system. In FIG. 2, 36 carriers (F0-F35) are utilized for preamble symbols. The 36 unmodulated carriers are evenly spaced into frequency bands and they may have the same power spectral density.

The number of carriers for the preamble of an MCM system is often affected by regulations in various countries and standardization bodies. For example, for power line communication (PLC) system, only certain frequency bands of the power line are allowed to be used for communication. Various standardization bodies are involved in regulations of frequency bands: Federal Communication Commission (FCC) in the United States, Association of Radio Industries and Businesses (ARIB) in Japan, and European Committee for Electrotechnical Standardization (CENELEC) in Europe. Table 1 illustrates various frequency bands for PLC system per standardization bodies.

TABLE 1

FCC, ARIB, and CENELEC Bands

|  | Frequency Low (KHz) | Frequency High (KHz) |
|---|---|---|
| FCC | 10 | 480 |
| ARIB | 10 | 450 |
| CENELEC A | 9 | 95 |
| CENELEC B | 95 | 125 |
| CENELEC C | 125 | 140 |
| CENELEC B, C | 95 | 140 |

Under these regulations, the number of carriers allowable in each frequency band is a constraint. In one embodiment of an OFDM system, it is assumed that the maximum spectral content of signals is 480 KHz, the sampling frequency at the transmitter and receiver may be selected to be 1.2 MHz that is about 240 KHz above the Nyquist rate to provide a sufficient margin. A fast Fourier Transform may be implemented for DFT and 256 frequency bins may be selected, which results in a frequency resolution for the OFDM carriers equal to 4.6875 KHz (Fs/N). Table 2 illustrates the number of allowable carriers for various frequency bands per standardization bodies in one embodiment under the assumption. For an OFDM receiving system (e.g., a PLC modem) regulated under FCC or ARIB, 36 carriers illustrated in FIG. 2 can be deployed freely. Yet, the same OFDM receiving system may not be deployed in Europe at CENELEC B and/or C bands. In this specification, a small number of carriers is defined as no higher than 18. Thus, small carrier sets are sets of carriers with no more than 18 carriers. While the embodiments of this invention may be utilized in an OFDM system with a small number of carrier sets in some scenarios, the focus of this specification is on the OFDM system with a larger carrier sets. Note a non-OFDM MCM system has similar constraints on the number of carriers allowed in frequency bands and embodiments of this invention may be utilized in the non-OFDM MCM system as well.

TABLE 2

Number of Carriers for Various Bands

|  | Number of Carriers | First Carrier (KHz) | Last Carrier (KHz) |
|---|---|---|---|
| FCC | 100 | 14.063 | 478.125 |
| ARIB | 93 | 14.0625 | 445.3125 |
| CENELEC A | 19 | 9.375 | 93.75 |
| CENELEC B | 6 | 98.4375 | 121.875 |
| CENELEC C | 3 | 126.5625 | 135.9375 |
| CENELEC B, C | 9 | 98.4375 | 135.9375 |

Figure 3:
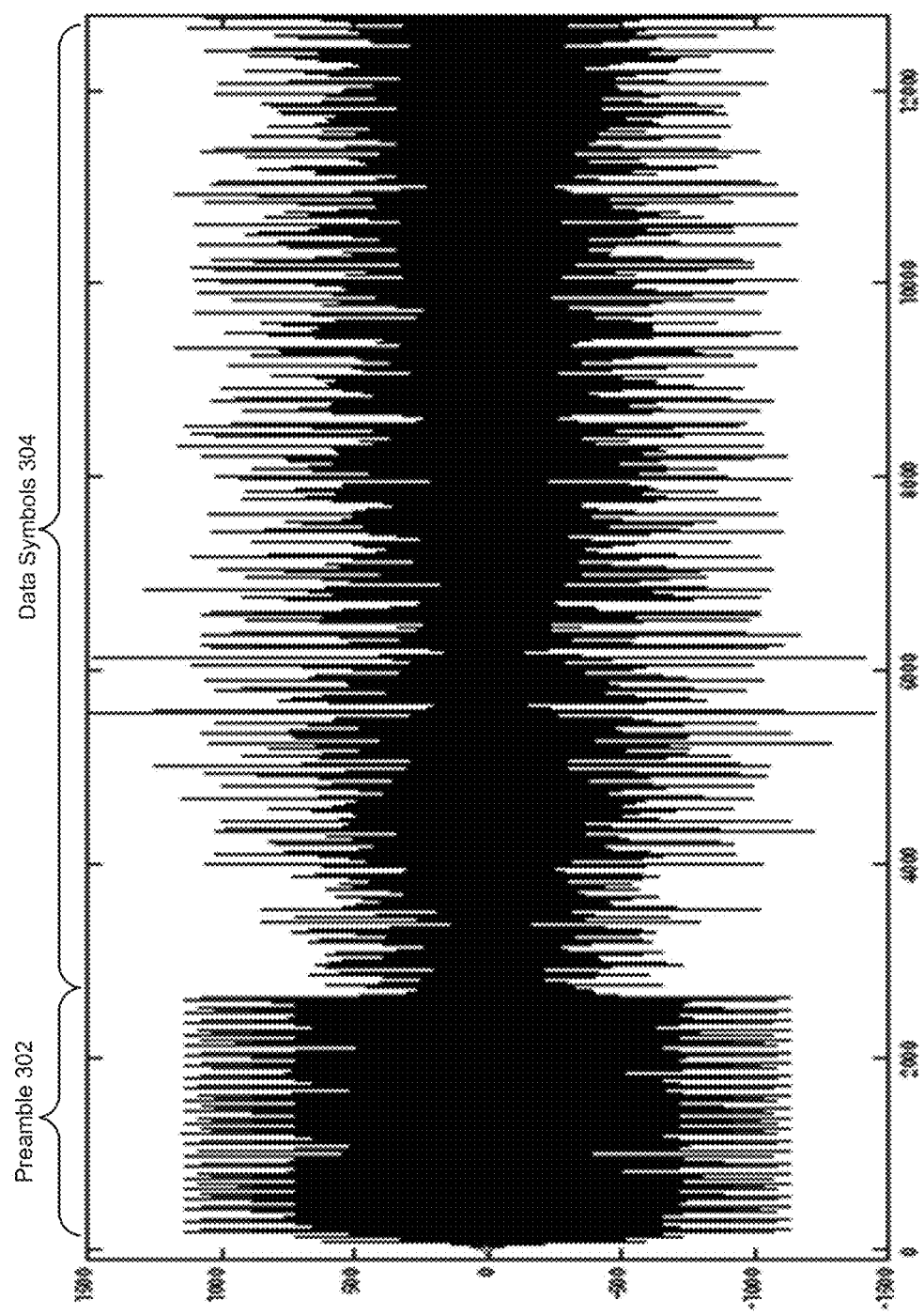
FIG. 3 illustrates a snapshot of an OFDM packet in an orthogonal frequency-division multiplexing (OFDM) system.

FIG. 3 illustrates a snapshot of an OFDM packet in an orthogonal frequency-division multiplexing (OFDM) system. The packet has preamble 302 consisting of 36 carriers. Each symbol of preamble 302 has consistent waveforms. The data symbols 304 vary widely in their waveforms.

Figure 4:
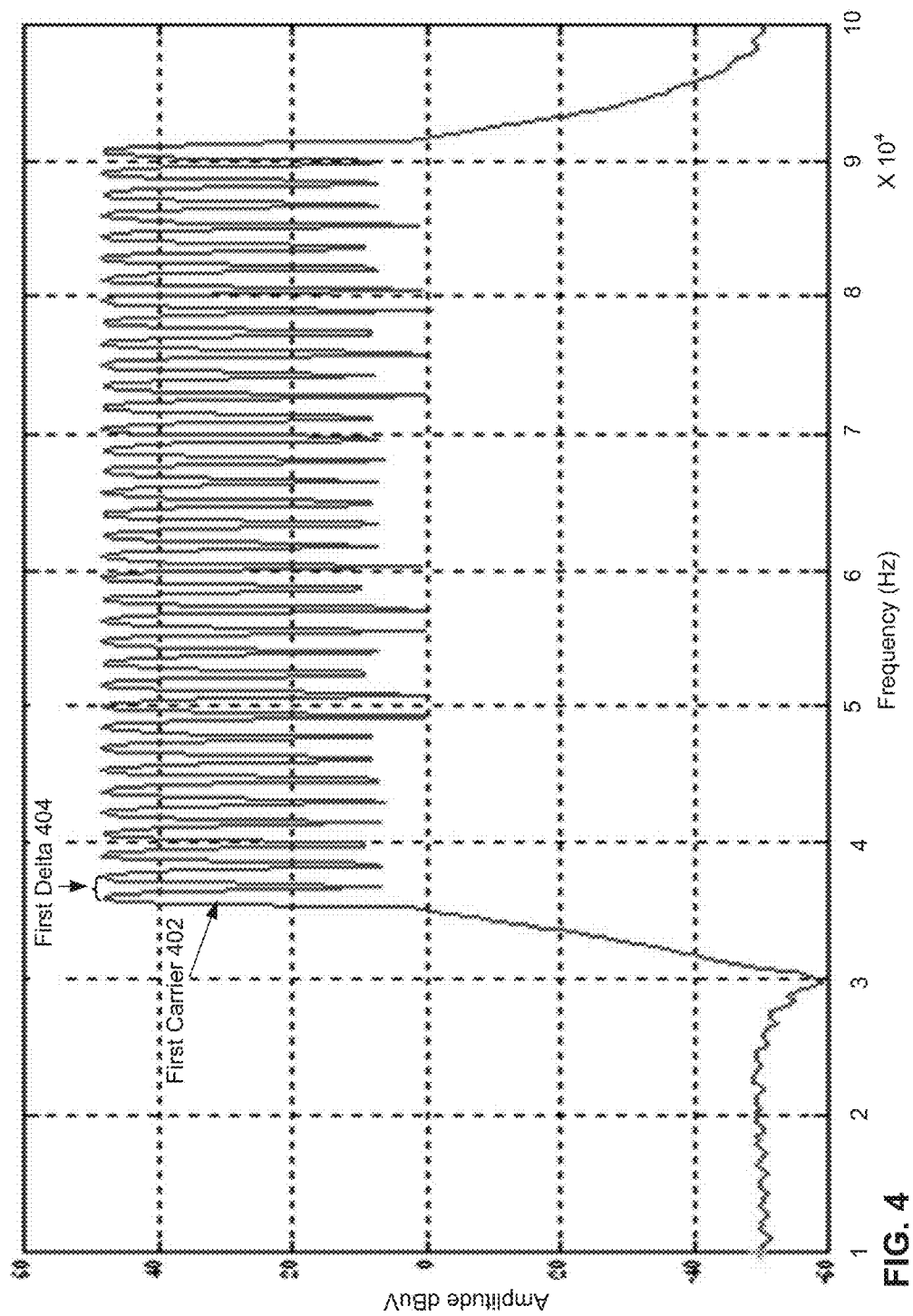
FIG. 4 illustrates a close-up frequency domain view of the preamble of an OFDM packet in an orthogonal frequency-division multiplexing (OFDM) system.

FIG. 4 illustrates a close-up view of the preamble of an OFDM packet in an orthogonal frequency-division multiplexing (OFDM) system. A fast Fourier Transform (FFT) has been performed on the preamble of an OFDM packet illustrated in FIG. 3 and the close-up view of FIG. 4 is the FFT of the preamble. The first carrier 402 is the first of a series of 36 carriers, and first delta 404 illustrates a frequency difference between two adjacent carriers.

The new approach of carrier detection starts from an observation of the carriers and their phases in an MCM system. The phase difference between adjacent carriers, after subtracting the initial phase difference offsets of the ideal waveforms, is (1) the same for every carrier pair, (2) proportional to the offset, and (3) independent of amplitude. Thus suitably compensated phase differences of the carriers of preamble of a packet are the same. One may detect the carriers of preamble of the packet based on this equality of differences and the synchronization is achieved due to the proportionality of the calculation's output value to symbol offset. The equality of differences is true for the packets composed of exactly the set of carriers, but not for noise or other common impairment.

When impairments consisting of multiple large in-band harmonics are added to the spectrum of preamble carriers, up to several of the phase differences will be affected. Slightly larger than the packet carrier amplitude, the impairments harmonics will dominate only those few phase measurements which are near the carrier bins, and further amplitude increases of the impairment will have little or no effect on output of this approach. That is, the effect on the equality of differences computation (unlike a correlation-based calculation) becomes relatively independent of the impairments amplitude.

A large number of carriers may be deployed for preambles of packets in many MCM systems (see table 2 herein above for an OFDM system regulated for PLC). With a large number of carriers (e.g., 18 or more carriers), the contamination of only a relatively few phase measurements (e.g., caused by the impairments harmonics) results in the overall computation being only slightly degraded. Thus, for an MCM system with a large number of carriers, the approach of examining equality of phase differences is robust in the presence of these types of impairments. For an MCM system with a smaller number of carriers (e.g., 18 or less carriers), the contamination of large in-band harmonics may make utilizing embodiments of this invention more challenging, and an alternative packet detection approach has been disclosed in the co-pending U.S. patent application Ser. No. 13/929,211, entitled "Method and Apparatus for Phase-Based Multi-Carrier Modulation (MCM) Packet Detection," filed Mar. 15, 2013. Note embodiments of the invention can still be utilized for packet detection in an MCM system with a smaller number of carriers where multiple large in-band harmonics is not a dominating concern.

In examining equality of phase difference, one may start with perfectly aligned symbols. When perfectly aligned with a symbol boundary, the output of the discrete Fourier Transform (DFT) of an aligned P-symbol will yield k complex values $A_k e^{j\theta_k}$, representing the reference phases for each carrier used. Before a packet is detected, the alignment of the points used in the computation of the DFT (commonly implemented with FFT) is necessarily arbitrary since the symbol boundaries are not known yet by the receiving system. When offset from the symbol boundary by r points the Discrete Fourier Transform output will yield a set of complex values where the value for the $k^{th}$ carrier is $$\gamma_k = A_k e^{j(2\pi f_0 k r + \theta_k)}$$

It is advantageous to be able to detect a packet by performing a computation only once every symbol time versus once every sample time and for that computation to yield the symbol offset and come up with a packet indication independent of the offset r. Ideally the packet detection computation yields a single value that is approximately proportional to the probability that the computation was performed on samples taken from a valid packet preamble. This single packet detection probability value can then compared to a threshold value to signal detection at the desired confidence level.

Figure 5:
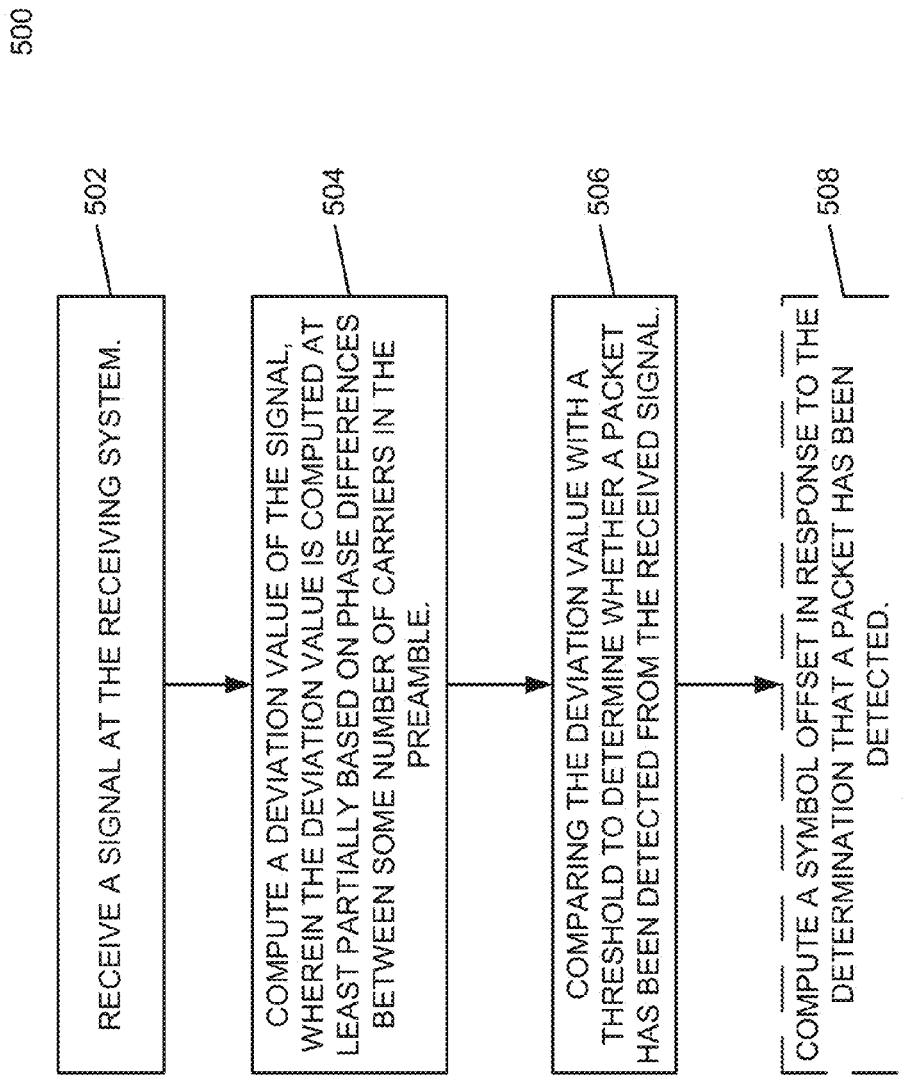
FIG. 5 illustrates a method of MCM packet detection according to one embodiment of the invention.

FIG. 5 illustrates a method of MCM packet detection according to one embodiment of the invention. Method 500 may be implemented in an MCM receiving system such as a PLC modem or any other system that shares characteristics of a PLC system. In an MCM system, data traffic is formatted as MCM packets to transmit through a transmission channel. The transmission channel may be a wireless/RF channel, copper wire, a power line, or others. An MCM packet includes a preamble, which consists of carriers without modulation, and each carrier contains an initial phase.

Method 500 starts at reference 502 with receiving a signal at the MCM receiving system. The signal may be obtained from sampling the transmission channel. Then the MCM receiving system computes a deviation value of the signal at reference 504. The deviation value is computed at least partially based on phase differences between some number of carriers of the preamble. As discussed in more detail herein below, there are various embodiments to obtain the set of phase differences depending on selecting of carriers for the computation, initial phase differences of the carriers, means to arrive at the deviation value, and other variables.

After the deviation value is derived, it is compared with a threshold at reference 506 to determine whether a packet has been detected from the received signal. Afterward, method 500 may continue at reference 508 and a symbol offset is computed in response to the determination that a packet has been detected. The computed symbol offset indicates a number of sample points from a beginning of a symbol. With a determination of packet detection and symbol offset, the MCM receiving system can decode the preamble and thus decode the data carried in the MCM packet. Note method 500 can be implemented in numerous ways depending on factors such as the characteristics of the MCM system, hardware/software constraints of system design and preference of embodiments.

Figure 6:
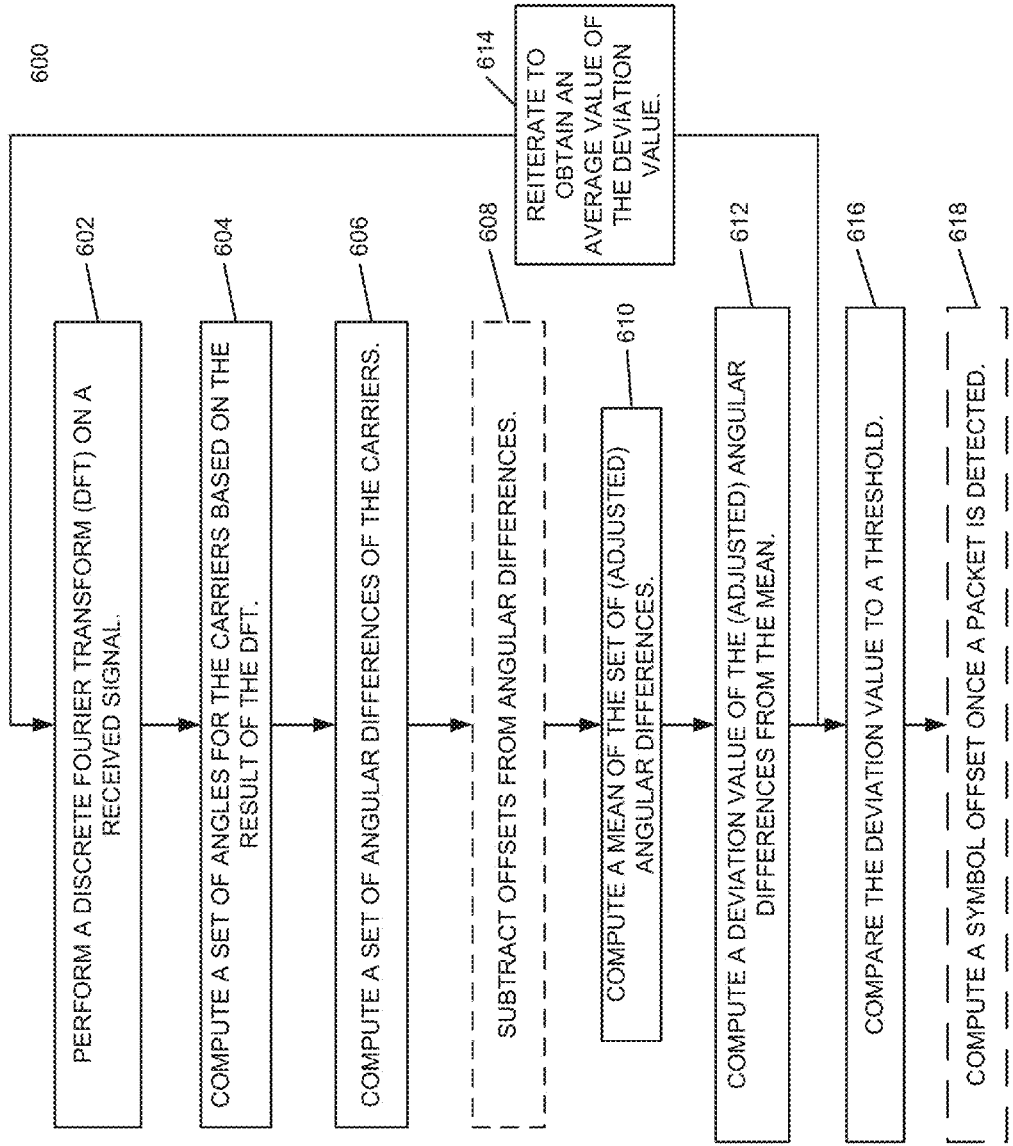
FIG. 6 illustrates a process of MCM packet detection according to one embodiment of the invention.

FIG. 6 illustrates a process of MCM packet detection according to one embodiment of the invention. Method 600 may be implemented in an MCM receiving system such as a PLC modem or any other system that shares characteristics of a PLC system. Method 600 discloses a step-by-step process to implement method 500 for illustration purpose but it is not meant to be the only way implementing method 500.

Method 600 starts at reference 602 with performing a discrete Fourier transform (DFT) on a received signal at the MCM receiving system. The signal may be obtained by sampling the transmission channel at a rate $f_s = N/T_s$ where $T_s$ is the computed (non-extended) symbol time. The sampling frequency $f_s$ and the binary integer N are chosen such that the resulting resolution of a Discrete Fourier Transform (often implemented with a fast Fourier Transform (FFT)) of N samples sampled at $f_s$ equals the MCM carrier spacing.

When an FFT is utilized, the MCM receiving system collects N consecutive samples and performs an N-point FFT on the sample set. The result contains the subset of $n_e$ complex values $$\gamma_k = A_k e^{j(2\pi f_0 k r + \theta_k)}$$

for $k = c_0$ to $c_0 + n_c - 1$, one for each carrier of the preamble.

Then at reference 604, a set of angles for the carriers is computed based on the result of the DFT. The angle $$\alpha_k = 2\pi f_0 k r + \theta_k$$

of each $\gamma_k$ is obtained by taking the arctangent of the ratio of the real and imaginary components of the FFT output for those $n_c$ frequency bins that are MCM carriers. Note that this angle should be modulo $2\pi$.

Onward to reference 606, a set of angular differences of the carriers is computed. The set of angular differences may be angular differences between adjacent frequency bins that are carriers for the preamble. With $n_c$ frequency bins, there are $n_c - 1$ angular differences expressed as $$\alpha_{k+1} - \alpha_k$$

In another embodiment, the angular differences may be sampled between non-adjacent frequency bins (e.g., every other frequency bins). In yet another embodiment, not all the $n_c$ frequency bins are utilized in obtaining angular differences.

Then optionally at reference 608, a set of offsets is subtracted from angular differences obtained in reference 606. Reference 608 is not needed when all the carriers for the preamble have the same initial phase. When the carriers have different initial phases, the angular difference is adjusted by subtracting the differences of the initial phases in one embodiment, thus the MCM receiving system obtains a set of adjusted angular differences $d_m$ through computation such as:

$$d_m = (\alpha_{k+1} - \alpha_k) - (\theta_{k+1} - \theta_k)$$

where $m = 0$ to $n_c - 1$ and $k = c_0$ to $c_0 + n_c - 1$.

Onward to reference 610, the MCM receiving system computes a mean of the set of angular differences, or a mean of the set of adjusted angular differences when the initial phases of the carriers are different. The mean D is defined in one embodiment as the angle formed from the means of the real and imaginary components of $d_m$:

$$D = \operatorname{atan2}^{-1}\left(\frac{\sum_{m=0}^{n_c-2} \cos(d_m)}{\sum_{m=0}^{n_c-2} \sin(d_m)}\right)$$

where a tan 2 gives the four quadrant arctangent angle.

Then at reference 612, a deviation value of the angular differences (or adjusted angular differences when the initial phases of the carriers are different) from the mean is computed. The deviation value, designated as $\nabla$, can be computed in a variety of ways. In one embodiment, it is computed by calculating the sum of the absolute values of the difference between $d_m$ and D, i.e., $$\nabla = \sum_{m=0}^{n_c-2} \operatorname{abs}(d_m - D)$$

In another embodiment, the deviation value ∇ may be computed by calculating differently. For example, the deviation value may be computed by calculating a root mean square (RMS) of the difference between $d_m$ and D.

The steps of references 602 to 612 may be reiterated several times for several symbol times in a row as indicated in reference 614. An operator of the MCM system may predetermine the proper number of iterations for a given implementation in one embodiment. In one embodiment, the number of iterations is configurable by software, firmware, hardware, or a combination thereof. When the number of iterations is set to one, the system does not reiterate and the step of references 602 and 612 will be performed only once. When the number of iterations is set to more than one, the system determines a way to combine the deviation values ∇ from different iterations. A variety of combination method may be implemented. For example, a running average of the last M calculations of ∇ is computed, and M=4 is used in one embodiment. In another embodiment, a form of weighted average of the ∇ is used to derive a single average deviation value ∇ from a number of deviation values.

Once the deviation value is computed, it is compared to a threshold value at reference 616. If the deviation value is below the threshold value, the MCM receiving system determines that a packet has been detected. The closer to zero the deviation value ∇ is, the higher the probability that there is a valid packet present. The threshold value is stored in the MCM receiving system and it may be predetermined by the system in one embodiment. In another embodiment, the threshold value is configurable and the configuration is through software, firmware, hardware, or a combination thereof.

Once it is determined that a packet has been detected. Optionally method 600 continues at reference 618 to compute a symbol offset. The symbol offset indicates a number of sample points from a beginning of a symbol. The symbol offset, designated as $O_s$, is computed through:

$$O_s = \frac{D*N}{2\pi}$$

In an ideal MCM system where impairments due to channel noises and other factors are nonexistent, the deviation value ∇ during the preamble symbol period should be zero. The deviation value ∇ is relatively insensitive to the amplitude level of MCM packets. Thus comparing deviation value ∇ (or an average deviation value ∇ where multiple iterations are performed) to a fixed threshold can be used to determine packet detection over a wide range of amplitude and noise conditions in the channel. This overcomes one of the major drawbacks of using a correlation-based algorithm as discussed herein above where the comparison threshold is a function of packet amplitude and the packet amplitude is generally unknown.

Furthermore, embodiments of this invention are more robust than the decoding the data portion of the packet which means the limiting factor for reliably decoding an MCM packet will be the data decoding and not the packet detection. The reason packet detection is more reliable is because both packet detection and data decoding rely on the accuracy of determining the received angles for each carrier, and yet the redundancy is generally greater for packet detection so it can tolerate greater phase errors and still function. The errors are randomly distributed and tend to cancel out each other. To decode a single bit of information, whether a valid packet is present or not, there are $n_c*M$ (e.g. 36*4=144 for one MCM system) phase angle measurements used. This is a much higher ratio of redundancy than the data section where the ratio typically ranges from 2-10. Thus, the process illustrated in FIG. 6 results in data decoding function be the limiting factor on whether or not a packet is successfully decoded, not packet detection based on preamble carrier detection.

The reasoning behind the embodiments of the invention as illustrated in FIGS. 5 and 6 can be explained mathematically. For clarity and simplicity of discussion, noise and other impairments are left out. It is assumed that an MCM preamble consists of multiple identical preamble P symbols $$P_n = \sum_{k=c_0}^{c_0+n_c-1} A_k e^{j(2\pi f_0 tk + \theta_k)}$$

where $c_0$ is the number of the first carrier in the MCM packet and $n_c$ is the number of carriers, and $A_k$ is the amplitude of the $k^{th}$ carrier. The frequency $f_0 = f_s/N$ is the fundamental frequency which is equal to the frequency spacing of the MCM packet.

After sampling at $f_s$, $P_i$ is obtained as:

$$P_i = \sum_{k=c_0}^{c_0+n_c-1} A_k e^{j\left(\frac{2\pi ki}{N} + \theta_k\right)}$$

since $f_0 = f_s/N$ and $t = i/f_s$ where i is a sample number. After the Discrete Fourier Transform of a set of N points r offset from a P symbol boundary, the subset of $n_c$ relevant Fourier Transform complex output values are $$\gamma_k = \left\{ A_k e^{j\left(\frac{2\pi c_0 r}{N} + \theta_k\right)}, A_{k+1} e^{j\left(\frac{2\pi (c_0+1) r}{N} + \theta_{k+1}\right)}, \right.$$
$$\left. \cdots, A_{k+n_c-1} e^{j\left(\frac{2\pi (c_0+n_c-1) r}{N} + \theta_{k+n_c-1}\right)} \right\}$$

Taking the 4-quadrant a tan $2^{-1}$ of the ratio of the imaginary and real components of this subset yields:

$$\alpha_k = \left\{ \frac{2\pi c_0 r}{N} + \theta_k, \frac{2\pi(c_0+1)r}{N} + \theta_{k+1}, \cdots, \frac{2\pi(c_0+n_c-1)r}{N} + \theta_{k+n_c-1} \right\}$$

Now taking $(n_c-1)$ modulo $2\pi$ differences between these angles yields the set of values $$\left\{ \frac{2\pi(c_0+1)r}{N} + \theta_{k+1} - \frac{2\pi c_0 r}{N} + \theta_k, \right.$$
$$\left. \frac{2\pi(c_0+2)r}{N} + \theta_{k+1} - \frac{2\pi(c_0+1)r}{N} + \theta_k, \cdots, \right\}$$

Next subtract the ideal set of delta angles $(\theta_{k+1} - \theta_k)$ of a valid preamble from the differences above and reduce the expression to yield the $n_c$ set of values $$d_m = \left\{ \frac{2\pi r}{N}, \frac{2\pi r}{N}, \cdots, \frac{2\pi r}{N} \right\}$$

which is a set of identical values which are function of the sample offset r.

Since there was no noise accounted for in this simplified discussion, the mean value is:

$$D = \frac{2\pi r}{N}$$

Note that the mean D must be taken modulo $2\pi$ and care must be taken when averaging angles that wrap.

Since all $d_m$ values are equal (or close to equal when some impairment is included), it is derived:

$$\nabla = \Sigma_{m=0}^{n_c-2} \text{abs}(d_m - D) = 0$$

a result that is independent of both the sample offset r and packet amplitude A.

Furthermore, symbol synchronization can be implemented using the information that the symbol offset in samples is:

$$r = \frac{D * N}{2\pi}$$

Figure 7:
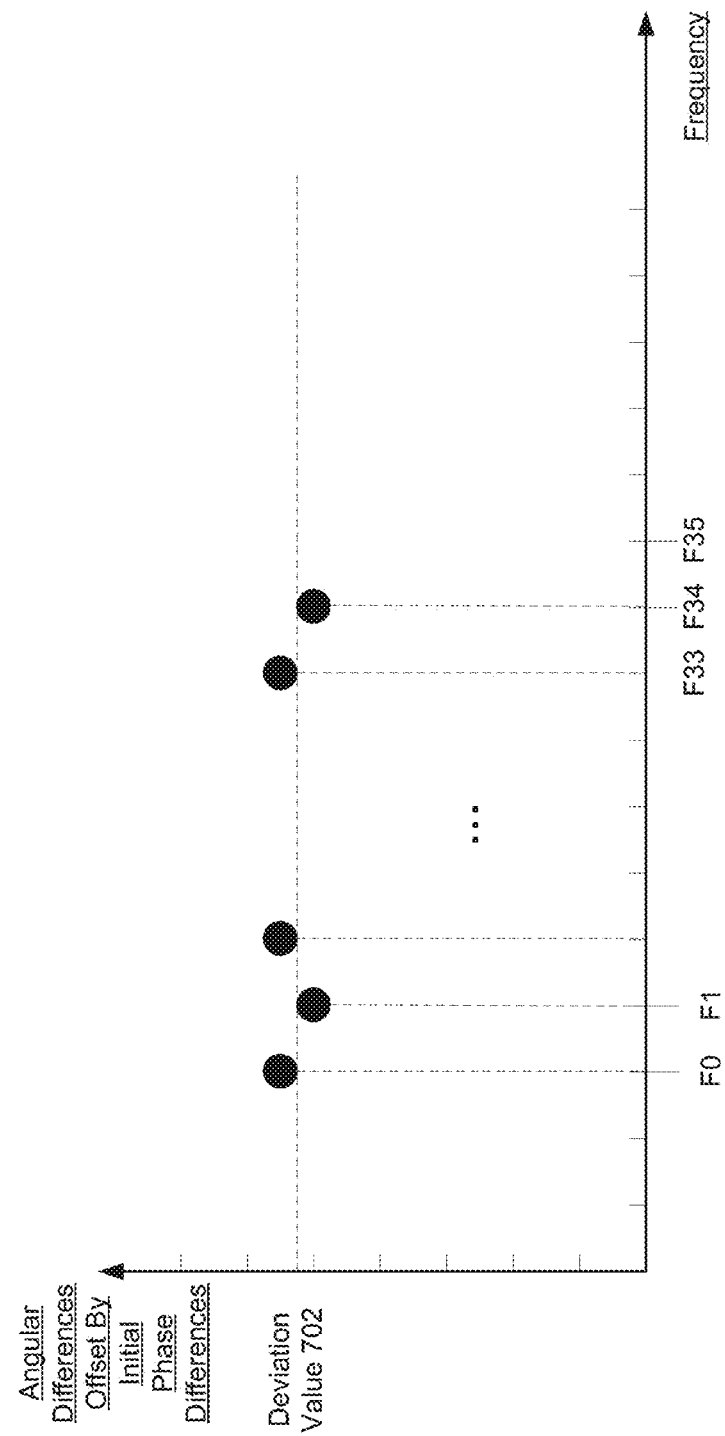
FIG. 7 illustrates a snapshot of phase differences of carriers of a single symbol of a live OFDM receiving system according to one embodiment of the invention.

FIG. 7 illustrates computation results for a carrier detection of an MCM receiving system according to one embodiment of the invention. The preamble of the MCM receiving system consists of 36 carriers, F0-F35. When angular differences between the carriers subtracting the initial phase differences between the carriers is computed, they are aligned close to each other in values. Deviation value 702 is calculated through ways discussed herein above in connection with references 602-614.

Figure 8:
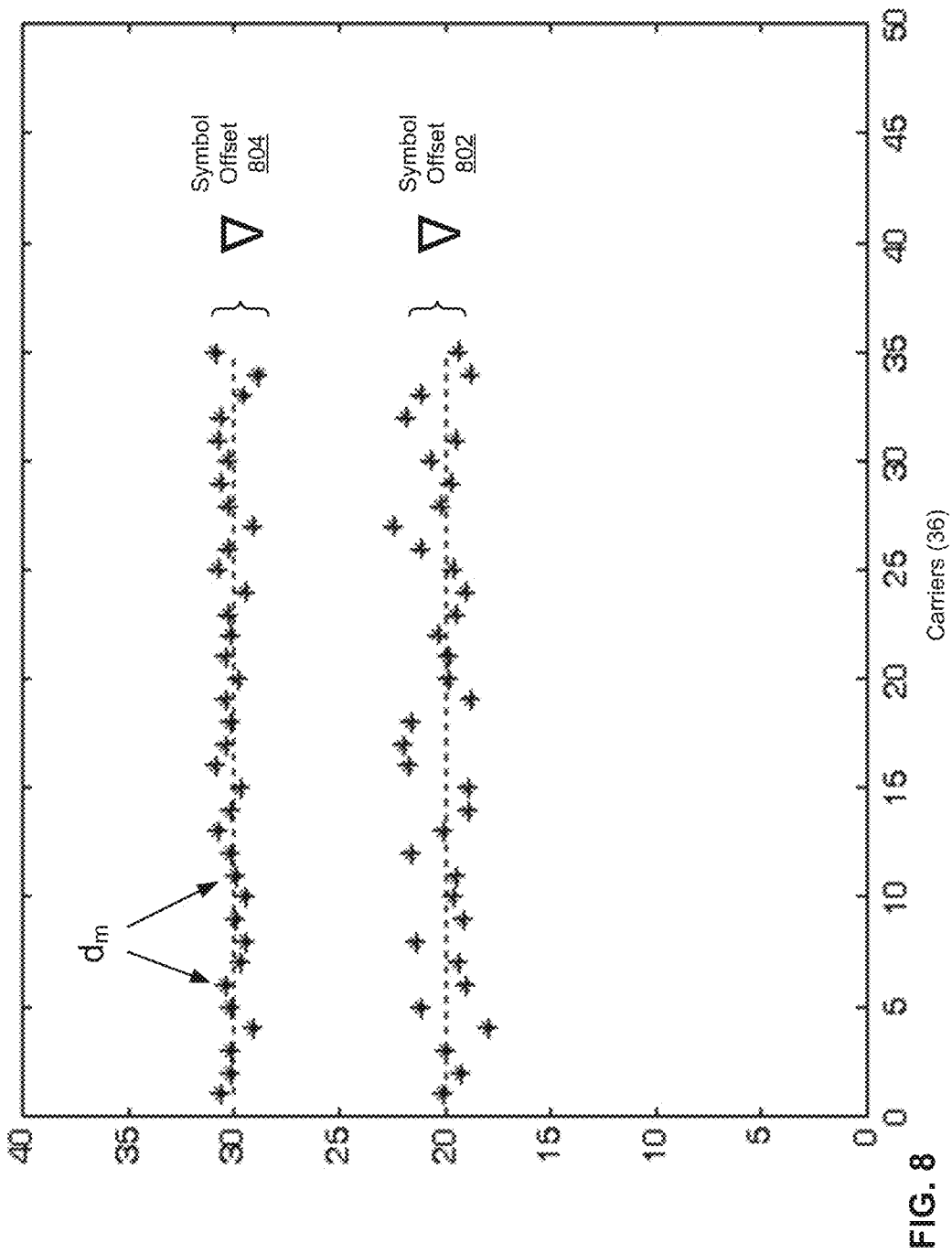
FIG. 8 illustrates a snapshot of phase difference measurements of carriers of a single symbol for two different offset cases of a live OFDM receiving system according to one embodiment of the invention.

FIG. 8 illustrates snapshots of computation results for carrier detections of a live OFDM receiving system according to one embodiment of the invention. The snapshots are two examples of the results of preamble carrier detection during a valid preamble. There are 35 individual (adjusted) deviation values (sometimes referred to as compensated carrier phase differences) $d_m$ plotted as asterisks, one value for each adjacent pair of carriers. The mean value of the set of 35 $d_m$ values associated with one calculation is represented by the dotted horizontal lines, but is scaled by $N/2\pi$. The (adjusted) deviation values are approximated by the spread of the dots around the mean value D and are shown with brackets.

The deviation values approximated by the brackets are compared to a threshold to determine whether a packet has been detected. Note adjustment of deviation values results from a means to average the deviation values as discussed hereinabove. Reference 802 illustrates the symbol offset of 20 samples from the symbol boundary and reference 804 illustrates the symbol offset of 30 samples. Note that while FIG. 8 uses a living OFDM receiving system to illustrate packet detection according embodiments of the inventions, a non-OFDM MCM receiving system can utilize packet detection utilizing embodiments of the invention as well.

Figure 9:
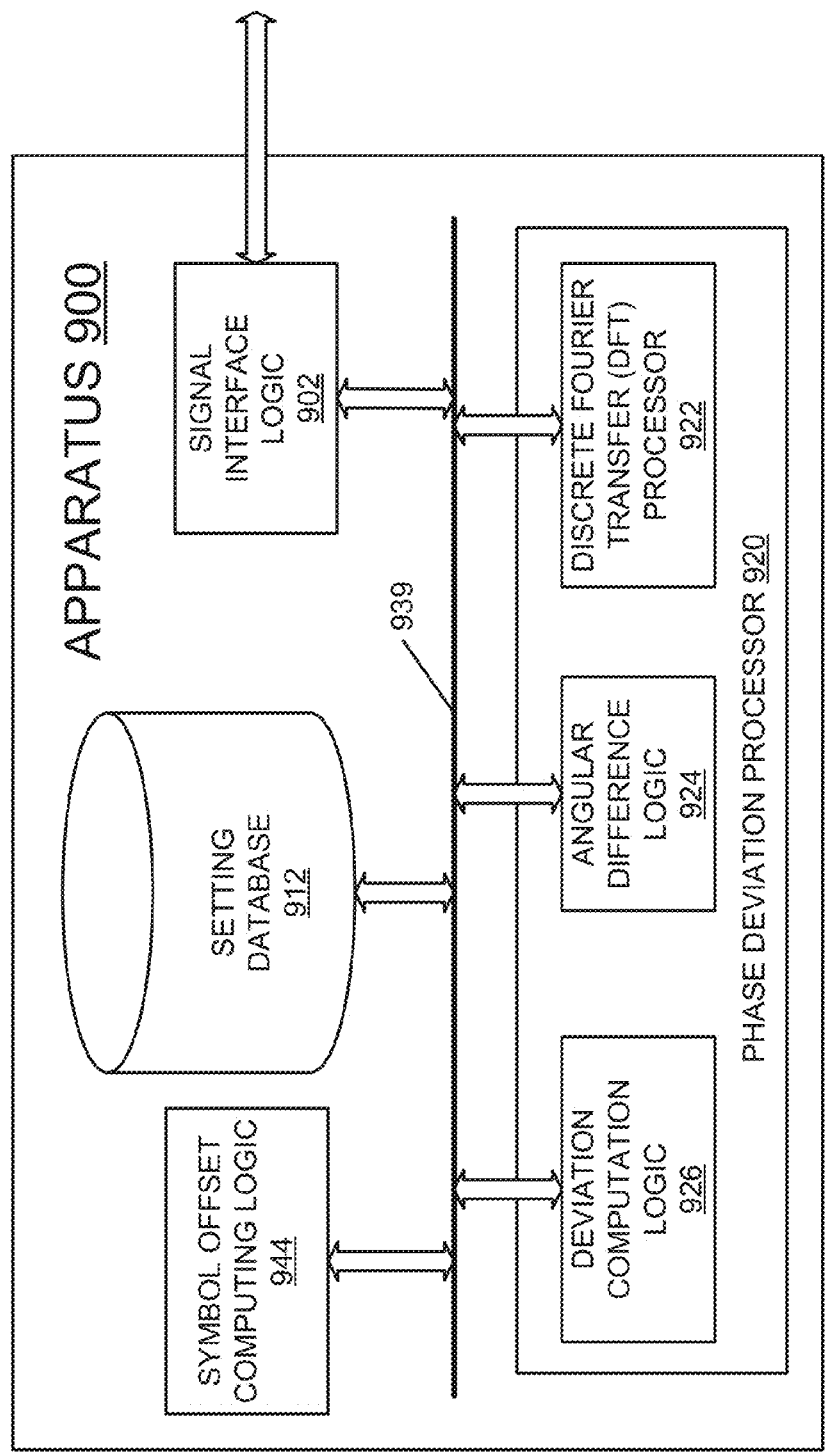
FIG. 9 illustrates an apparatus implementing the packet detection and synchronization methods according to an embodiment of the invention.

FIG. 9 illustrates an apparatus implementing the packet detection and synchronization methods according to an embodiment of the invention. Apparatus 900 is implemented as an MCM receiving system. The MCM receiving system may be a part of an MCM system utilizing a transmission channel of a power line, a radio frequency channel, an optical fiber, or a copper line, depending on implementation. When the transmission channel is a power line, the MCM system complies with G3-Power Line Communication physical layer specification in one embodiment. In the MCM system, traffic is modulated as packets and transmitted packets include preamble for packet detection. The preamble for each packet consists of a number of carriers without modulation (i.e., unmodulated carrier), and each carrier contains an initial phase.

Apparatus 900 contains signal interface logic 902, phase deviation processor 920, symbol offset computing logic 944, and setting database 912. These modules are communicatively coupled via interconnect 939, which may be a bus connection in one embodiment. Note apparatus 900 contains other modules and logic not shown as they are not essential to embodiments of the invention. The various logics may be implemented as a single unit, or multiple units can combine two or more units within apparatus 900. Not all embodiments of the invention contain all logics disclose herein and some logics are not utilized in some embodiments and they may not be implemented these embodiments. Also, deviation computation processor 920 can be general purpose or special purpose processors. The individual logics can contain their dedicated network process units (NPUs) or they can share NPUs among multiple logics.

In one embodiment, phase deviation processor 920 comprises discrete Fourier transfer (DFT) processor 922, angular difference logic 924, and deviation computation logic 926. In one embodiment, DFT processor 922 is implemented with a fast Fourier transform (FFT). Angle difference logic 924 is configured to compute a set of angular differences from a set of carriers based on the result of DFT process 922. The set of angular differences is angular differences between adjacent frequency bins that are carriers for a preamble of the signal in one embodiment. In one embodiment where the carriers have different initial phases, the set of angular differences are adjusted by subtracting the differences of the initial phases of the carriers. Angular difference logic 924 is further configured to compute a mean of the set of angular differences. The mean can be computed in a variety of ways known in the art. The results of the computations are then forwarded to deviation computation logic 926, which is configured to derive a deviation value from the set of angular differences. As discussed herein above, the deviation value can be derived in a variety of ways known in the art. Then the deviation value is used to compare with a threshold value stored in setting database 912 to determine if a packet has been detected. If the phase variance sum is lower than the threshold value, it's determined that a packet has been detected.

Once a packet has been detected, symbol offset computing logic 944 is configured to determine the symbol offset to synchronize with the packet. The symbol offset indicates a number of sample points from the beginning of a symbol. The symbol offset is calculated though forming a weighted average of phase differences between some number of carriers in the preamble. For example, the phase differences can be a set of phase differences between adjacent carriers in the preamble.

The operations of the flow diagram have been described with reference to the exemplary embodiment of FIG. 9. However, it should be understood that the operations of flow diagrams can be performed by embodiments of the invention other than those discussed with reference to FIGS. 5 and 6, and the embodiments discussed with reference to FIG. 9 can perform operations different than those discussed with reference to the flow diagrams of FIGS. 5 and 6.

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A machine-implemented method of detecting packets at a receiving system in a Multi-Carrier Modulation (MCM) system, wherein packets are transmitted through the MCM system, wherein each transmitted packet includes a preamble for packet detection, wherein the preamble for each packet consists of a number of carriers without modulation, wherein each carrier contains an initial phase, and wherein the number of carriers are transmitted in a plurality of a symbol duration, the method comprising:
   receiving a signal at the receiving system;
   computing a deviation value of the signal, wherein the deviation value is computed at least partially based on phase differences between some number of carriers in the preamble; and
   comparing the deviation value with a threshold to determine whether a packet has been detected from the received signal.

2. The machine-implemented method of claim 1, wherein the phase differences are between pairs of immediately adjacent carriers.

3. The machine-implemented method of claim 1, wherein obtaining the phase differences between some number of carriers in the preamble includes removing initial phase differences of some number of carriers.

4. The machine-implemented method of claim 1, wherein the deviation value computation includes summing up the phase differences between the some number of carriers in the preamble.

5. The machine-implemented method of claim 4, wherein the summing up the phase differences between the some number of carriers in the preamble includes forming a weighted average of the phase differences.

6. The machine-implemented method of claim 5, wherein the deviation value computation includes computing a deviation from the weighted average of the phase differences.

7. The machine-implemented method of claim 1, wherein the number of carriers is no less than 18.

8. The machine-implemented method of claim 1, wherein the MCM system is a power line communication (PLC) system.

9. The machine-implemented method of claim 8, wherein the PLC system complies with G3-Power Line Communication (PLC) physical layer specification.

10. The machine-implemented method of claim 1, further comprising computing a symbol offset in response to the determination that a packet has been detected, wherein the symbol offset indicates a number of sample points from a beginning of a symbol.

11. The machine-implemented method of claim 10, wherein the computing the symbol offset includes forming a weighted average of the phase differences between the some number of carriers in the preamble.

12. The machine-implemented method of claim 1, wherein the MCM system is an orthogonal frequency-division multiplexing (OFDM) system.

13. An apparatus implemented as a receiving system in a Multi-Carrier Modulation (MCM) system, wherein traffic is modulated as packets transmitted through the MCM system, wherein each transmitted packet includes a preamble for packet detection, wherein the preamble for each packet consists of a number of carriers without modulation, and wherein each carrier contains an initial phase, the apparatus comprising:
   a signal interface logic configured to receive signals;
   a phase deviation processor configured to compute a deviation value of the signal, wherein the deviation value is computed at least partially based on phase differences between some number of carriers in the preamble, and the phase deviation processor further configured to compare the deviation value obtained with a threshold to determine whether a packet has been detected from the received signal; and
   a setting database configured to store the threshold.

14. The apparatus of claim 13, wherein deviation computation processor comprises:
   a delta computation logic configured to remove initial phase differences of the some number of carriers.

15. The apparatus of claim 13, wherein the deviation value computation includes summing up the phase differences between the some number of carriers in the preamble.

16. The apparatus of claim 15, wherein the summing up the phase differences between the some number of carriers in the preamble includes forming a weighted average of the phase differences.

17. The apparatus of claim 16, wherein the deviation value computation includes computing a deviation from the weighted average of the phase differences.

18. The apparatus of claim 13, wherein the number of carriers is larger than 18.

19. The apparatus of claim 13, wherein the MCM system is a power line communication (PLC) system.

20. The apparatus of claim 19, wherein the PLC system complies with G3-Power Line Communication (PLC) physical layer specification.

21. The apparatus of claim 13, further comprising a symbol offset computing logic configured to compute a sample offset in response to the determination that a packet has been detected, wherein the symbol offset indicates a number of sample points from a beginning of a symbol.

22. The apparatus of claim 13, wherein the MCM system is an orthogonal frequency-division multiplexing (OFDM) system.

* * * * *